(12) United States Patent
Metzger et al.

(10) Patent No.: US 8,718,350 B2
(45) Date of Patent: May 6, 2014

(54) COMPUTERIZED METHODS FOR TISSUE ANALYSIS

(75) Inventors: Gregory Metzger, Stillwater, MN (US); Stephen C. Schmechel, Saint Paul, MN (US); Stephen Dankbar, Eagan, MN (US); Jonathan Henriksen, Eden Praire, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 197 days.

(21) Appl. No.: 13/442,852

(22) Filed: Apr. 9, 2012

(65) Prior Publication Data

US 2012/0257811 A1 Oct. 11, 2012

Related U.S. Application Data

(60) Provisional application No. 61/473,706, filed on Apr. 8, 2011.

(51) Int. Cl.
*G06K 9/00* (2006.01)
*C40B 50/06* (2006.01)

(52) U.S. Cl.
USPC .............................. 382/133; 382/220; 506/26

(58) Field of Classification Search
CPC .................................. G06K 9/00; C40B 30/00
USPC ......... 382/100, 103, 106–107, 128–134, 162, 382/168, 173, 181, 199, 203, 219–220, 232, 382/254, 274, 276, 286, 291, 305, 312; 506/7, 33, 26; 436/180; 435/4

See application file for complete search history.

(56) References Cited

U.S. PATENT DOCUMENTS

| | | | |
|---|---|---|---|
| 7,272,252 | B2 * | 9/2007 | De La Torre-Bueno et al. ............... 382/133 |
| 7,557,070 | B2 * | 7/2009 | Ravkin et al. .................... 506/33 |
| 2003/0059764 | A1 * | 3/2003 | Ravkin et al. ..................... 435/4 |
| 2005/0282292 | A1 * | 12/2005 | Torre-Bueno ................. 436/180 |
| 2009/0247416 | A1 * | 10/2009 | Can et al. ........................... 506/7 |
| 2010/0111396 | A1 * | 5/2010 | Boucheron ................... 382/133 |

* cited by examiner

*Primary Examiner* — Seyed Azarian
(74) *Attorney, Agent, or Firm* — Coastal Patent Law Group, P.C.

(57) ABSTRACT

A computerized method for immunohistochemistry analysis of tissue utilizes digital images of multiple adjacent tissue sections aligned within a computerized software and processed with an algorithm to quantify a two-dimensional IHC signature score for each respective slide image. In various embodiments, the IHC score is performed over several adjacent sections and further processed to produce a three-dimensional IHC quantification referred to as an IHC signature map.

3 Claims, 7 Drawing Sheets

COMPUTERIZED METHODS FOR TISSUE ANALYSIS

CROSS-REFERENCE TO RELATED APPLICATIONS

This application claims priority to U.S. Provisional Ser. No. 61/473,706, filed Apr. 8, 2011, the contents of which are hereby incorporated by reference.

STATEMENT REGARDING FEDERALLY SPONSORED RESEARCH OR DEVELOPMENT

This invention was made with government support under CA101955, CA077598, CA119092, and CA131013 awarded by the National Institutes of Health. The government has certain rights in the invention.

FIELD OF THE INVENTION

This invention relates generally to tissue analysis; and more particularly, to computerized methods for analysis of tissue objects.

BACKGROUND OF THE INVENTION

Pathologists utilize various immunohistochemistry (IHC) assays for quantification of cellular material, often in terms of expression values within targeted tissue areas, such as for example the relative number of carcinoma cells versus background stroma and benign epithelial cells within a tissue section. Of course, a myriad of IHC assays are currently available and optimized for expression of various proteins and these methods are not limited to the above example.

IHC assays are optimized for methods of tissue handling that are universally applied to tumor samples in clinics, procedure rooms, radiology suites, operating rooms, and pathology laboratories. Standardized methods include immersion of tissues in buffered formalin followed by processing into paraffin blocks.

From paraffin blocks, the tissue can be sectioned into very thin sections, for example 3-4 μm in thickness, for incorporating into microscope slides. Adjacent tissue sections can then be digitally scanned into a computer system for digital analysis by a pathologist.

In a general sense, one or more IHC stains, or biomarkers, can be applied to a tissue sample and slide for viewing under a microscope. Enabled by the stain, a pathologist may view the slide and mark or count areas tending to indicate the presence of a particular object or material, such as cancer cells. Certain stains, or biomarkers, are well known for use with various target proteins and are generally available and accessible via an internet search to those having skill in the art.

Certain whole slide imaging (WSI) and other software methods have become popularized in recent years for the acquisition of diagnostic quality digital images of tissue slides for use in pathology and related fields. Additionally, certain software methods have been developed for image registration and alignment on a digital platform.

In practice, certain single gene assays utilize a single biomarker for application on a tissue section and manual quantification by a trained pathologist, requiring excessive time and subject to human errors in the analysis. Furthermore, it is often problematic for a pathologist to attempt an analysis based on a single biomarker.

Present methods for pathology analysis are limited to physical notation and analysis by a trained practitioner. Currently, there has yet to be developed a method for automation of tissue analysis using one or more biomarkers on a computerized platform.

SUMMARY OF THE INVENTION

Methods are disclosed for use in computerized tissue analysis using a number of diagnostic quality digital images of thinly sectioned adjacent tissue samples and various biomarkers on a computerized platform.

In a general embodiment, a method for tissue analysis includes: preparing two or more microscope slides each containing thinly sectioned adjacent tissue samples and a biomarker; acquiring diagnostic quality digital images of the samples within the microscope slides; registering each of the digital images to form a computerized alignment therebetween; overlaying a virtual grid over each of the digital images; assigning an IHC score for each grid square of each digital image; and summating the IHC scores across one or more slides and thus one or more adjacent tissue samples to determine an IHC signature score.

In certain embodiments, the IHC signature score is further displayed as a two-dimensional representation across the tissue section to define an IHC signature map. The IHC signature map provides an n-gene profile of the analyzed sample.

These methods can be programmed into a computer or similar device for automated processing and analysis of digital slide images.

BRIEF DESCRIPTION OF THE DRAWINGS

In accordance with various embodiments, these and other features are hereinafter described in the following detailed description with reference to the appended drawings, wherein.

DETAILED DESCRIPTION

Figure 1:
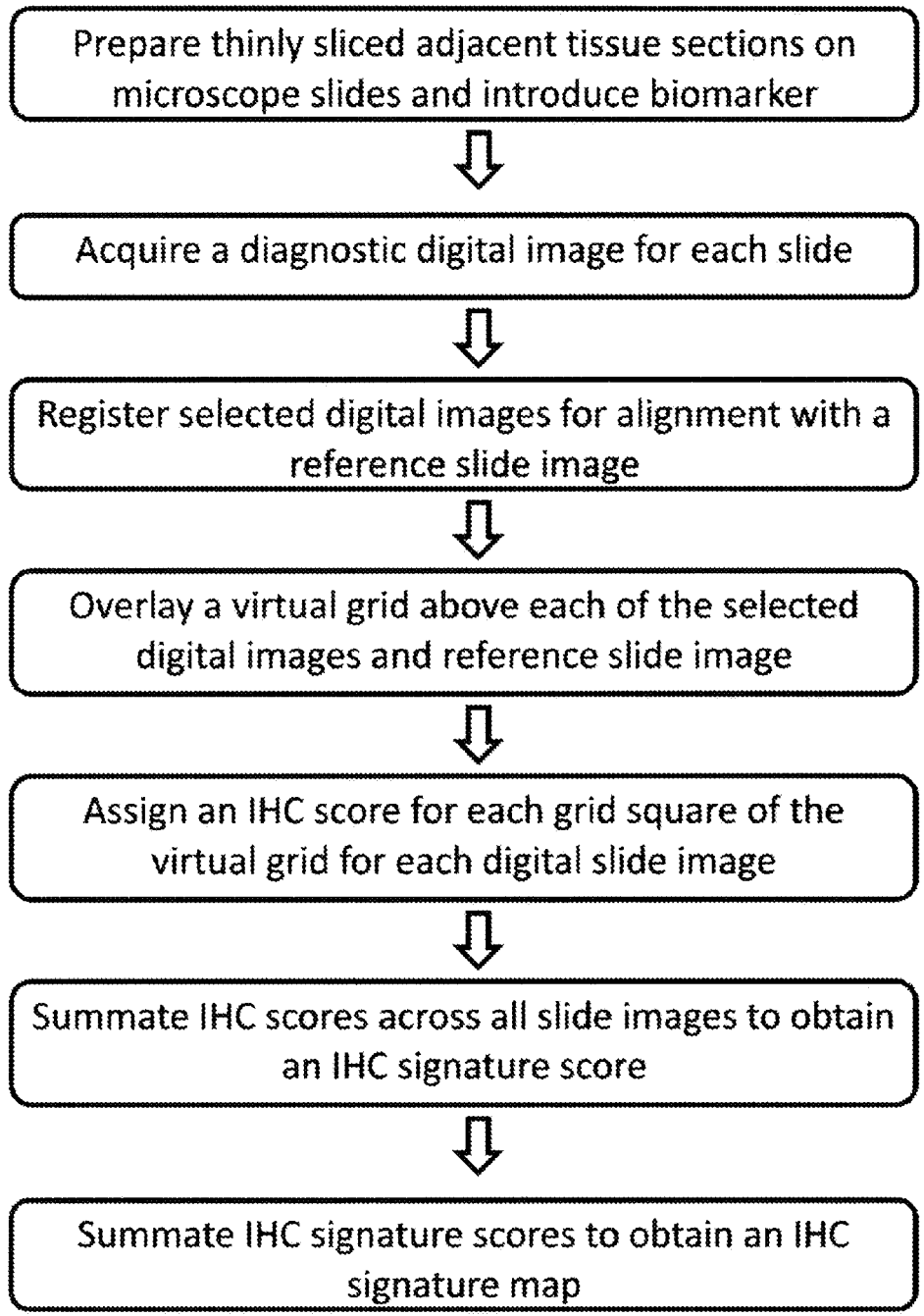
FIG. 1 illustrates a flow chart representing a general method of the invention.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention. Certain embodiments will be described below with reference to the drawings wherein illustrative features are denoted by reference numerals.

Application of a gene expression signature to a patient specimen often involves application of a regression equation derived from initial experimental data. It is often that these signatures are composed of multiple genes each of which have been found to exhibit either increased or decreased expression for a certain disease state. The regression equation is a weighted sum for each gene where a weight reflects the degree a specific gene is related to the outcome variable of interest and is either positive or negative depending on whether a higher or lower expression of the gene is correlated with outcome. A simple n-gene classifier to generate signature maps, $S(\vec{r})$ is given as:

$$S(\vec{r}) = \sum_{i=1}^{n} w_i \times \text{gene}(\vec{r})_i,$$ Equation 1 where the vector $\vec{r}$ denotes the spatial dimensions and $w_i$ is the weighting factor for $\text{gene}_i$. The spatial aspect to this expression is not available when performing standard proteomic and genomic assays and is an important advantage provided by IHC performed on tissue sections as described herein.

In a general embodiment of the invention, a method is provided for quantitative analysis of tissue samples across a digital platform. The method includes preparation of a plurality of microscope slides to each contain an adjacent tissue section, each tissue section having one or more regions of interest and optionally comprising a biomarker for pathology analysis; acquisition of digital images to include an image of each slide to be analyzed; registration of each digital image of the various slides to substantially align the various slides and contained adjacent tissue sections; overlaying a digital grid over each of the digital images, wherein the grid includes a plurality of grid squares each having a configurable size; assigning an IHC score for each grid square of each digital image; and summating the IHC scores across one or more slides, and thus one or more adjacent tissue samples, to determine an IHC signature score. In an optional step, each IHC signature score is further displayed as a two-dimensional representation across the tissue section to define an IHC signature map. The these methods to obtain an IHC signature map offers a means for n-gene profiling for enhanced value relative to single gene assays as well as systematic improvements through automation.

Portions of the above method have been implemented into computerized software utilizing a computer being programmed to perform each of the method steps for transforming the slide images into a virtual grid and analyzing the grid to yield IHC signature scores and a unique IHC signature map for a given tissue sample. In this regard, digital slide images are transformed into an IHC map for use by pathologists. Other benefits will be recognized by those having skill in the art upon a thorough review of the following detailed description.

For purposes of this invention, the term "IHC slide" is herein defined as stained and digitized immunohistochemistry (IHC) data from a single tissue block.

The term "IHC score" is herein defined as a quantification of IHC data at a single pixilated region of an image.

The term "IHC map" is herein defined as a two-dimensional representation of IHC scores across an IHC slide.

The term "IHC signature map" is herein defined as multiple IHC maps summated with weights determined from a validated n-gene protein expression model across an IHC slide.

In preparation of digitized tissue analysis according to various methods herein, a number of whole slide images must first be acquired. In practice, a tissue sample is first formed into a paraffin block according to methods known to those having skill in the art. The paraffin block is then sectioned into approximately 3 μm sections (+/−1 μm) and each section is placed on a microscope slide and ultimately may be stained with a predetermined biomarker. Each of the thinly sectioned samples is carefully maintained in order for comparison between adjacent sections. A digital camera is used to scan each of the slides and a digital image for each slide is acquired and stored in a directory folder on a computer.

Now turning to the drawings, FIG. 1 illustrates an exemplary method for n-gene profiling according to various embodiments of the invention.

Figure 2:
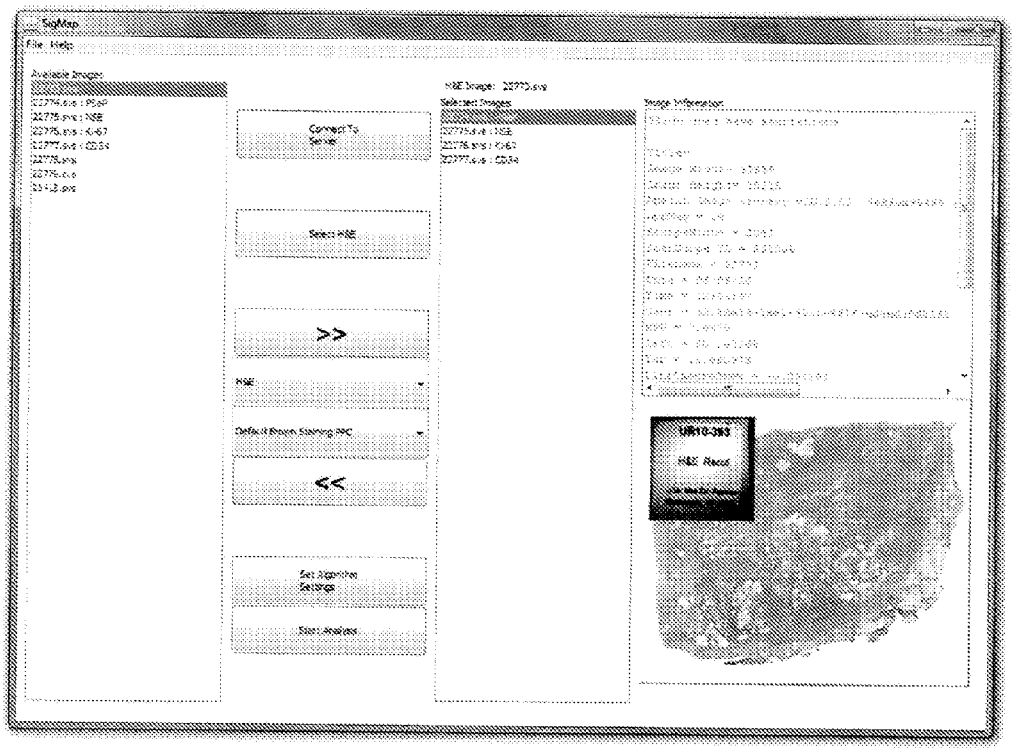
FIG. 2 illustrates a screenshot of a tissue analysis software adapted to select a number of slide images for analysis.

FIG. 2 is a screenshot of a tissue analysis software programmed to obtain whole slide digital images and further process according to various tissue analysis methods described herein. A number of images may be previewed in a preview window and ultimately selected for analysis. The tissue analysis software is further programmed to display a list of available images, a list of selected images for analysis, and image information relating to a highlighted or previewed image.

Figure 3:
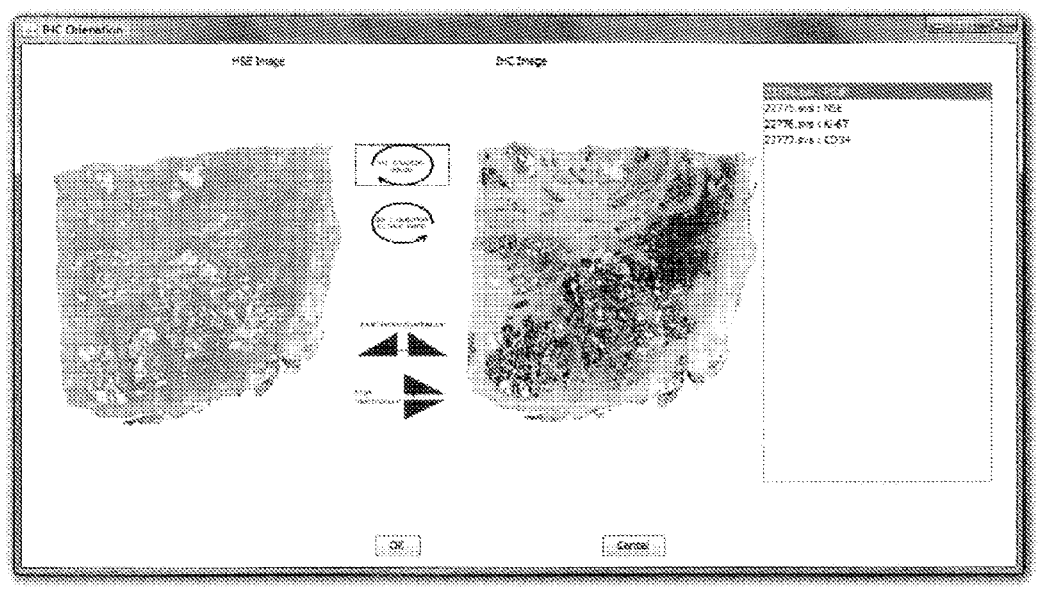
FIG. 3 illustrates a screenshot illustrating a tissue analysis software adapted to receive user inputs for registering one or more selected images with a reference image.

FIG. 3 illustrates a registration process using the tissue analysis software, wherein the software is programmed to display two or more selected images and receive user inputs for rotating or flipping a dependent image to within a 90 degree relation with a reference image. Once the images are coarsely aligned, an automated registration is further used to precisely register each selected image with the reference image using techniques known to those having skill in the art.

Figure 4:
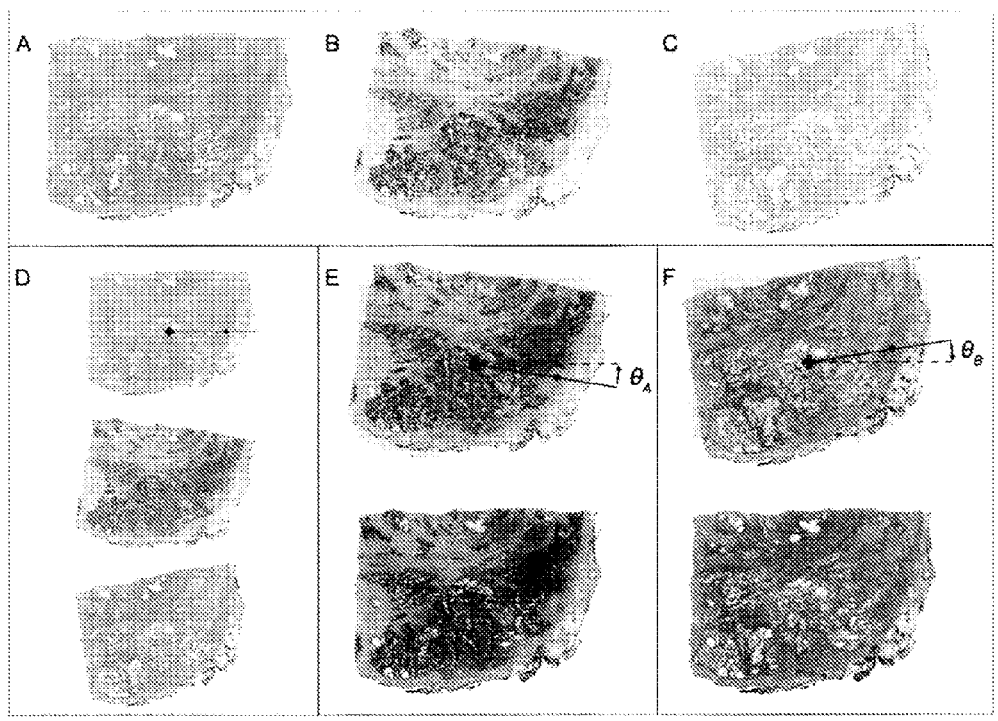
FIG. 4 illustrates a plurality of whole slide images of adjacent tissue sections for use in obtaining an n-gene profile according to various methods of the invention.

FIG. 4 illustrates a series of slide images each stained with a distinct biomarker. Prior to analysis each slide is registered according to the registration steps illustrated in FIG. 3.

Figure 5:
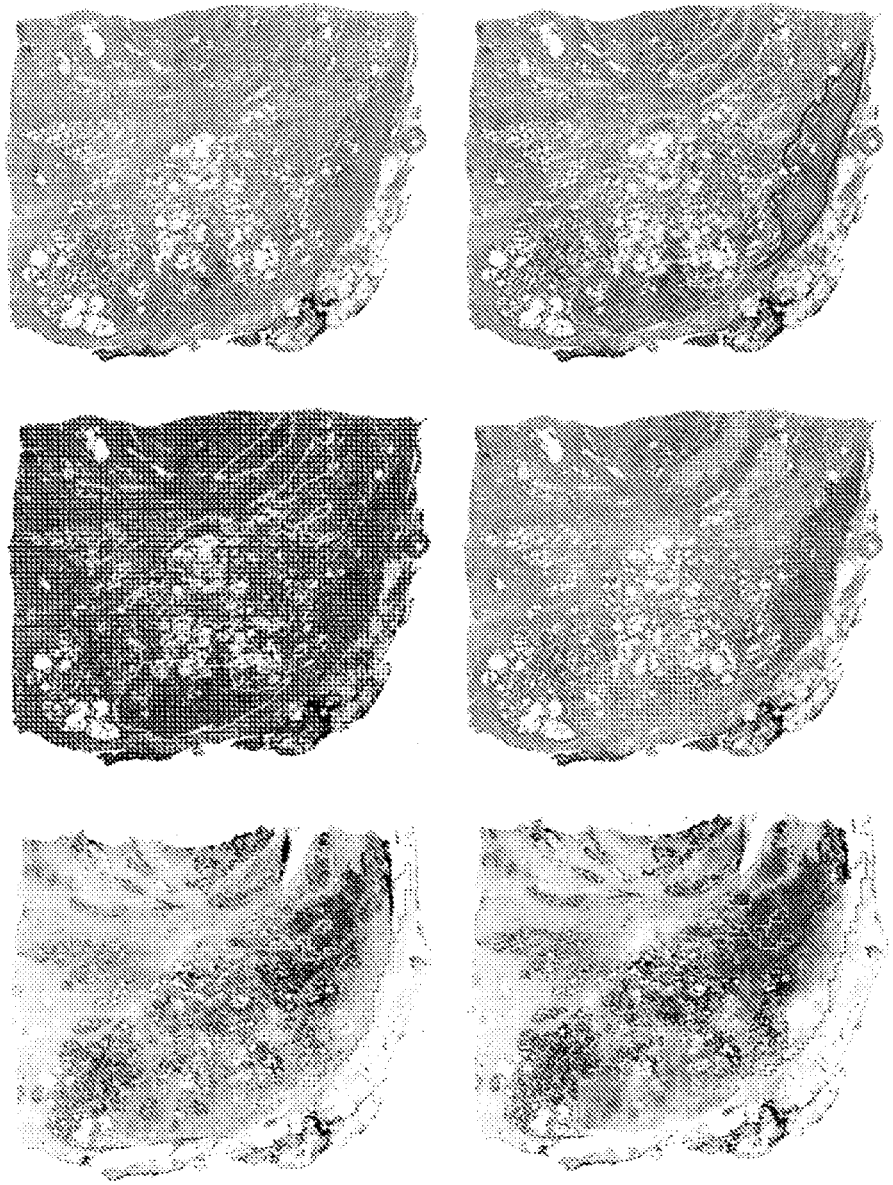
FIG. 5 illustrates various layers each including one or more annotations for use in effectuating a tissue analysis thereon.

FIG. 5 illustrates detailed annotations made by a user on a reference slide image. Multiple layers can be separately annotated, and separately analyzed for one or more IHC score interpretations. In each case, the annotations mark a region of interest for IHC analysis.

Figure 6:
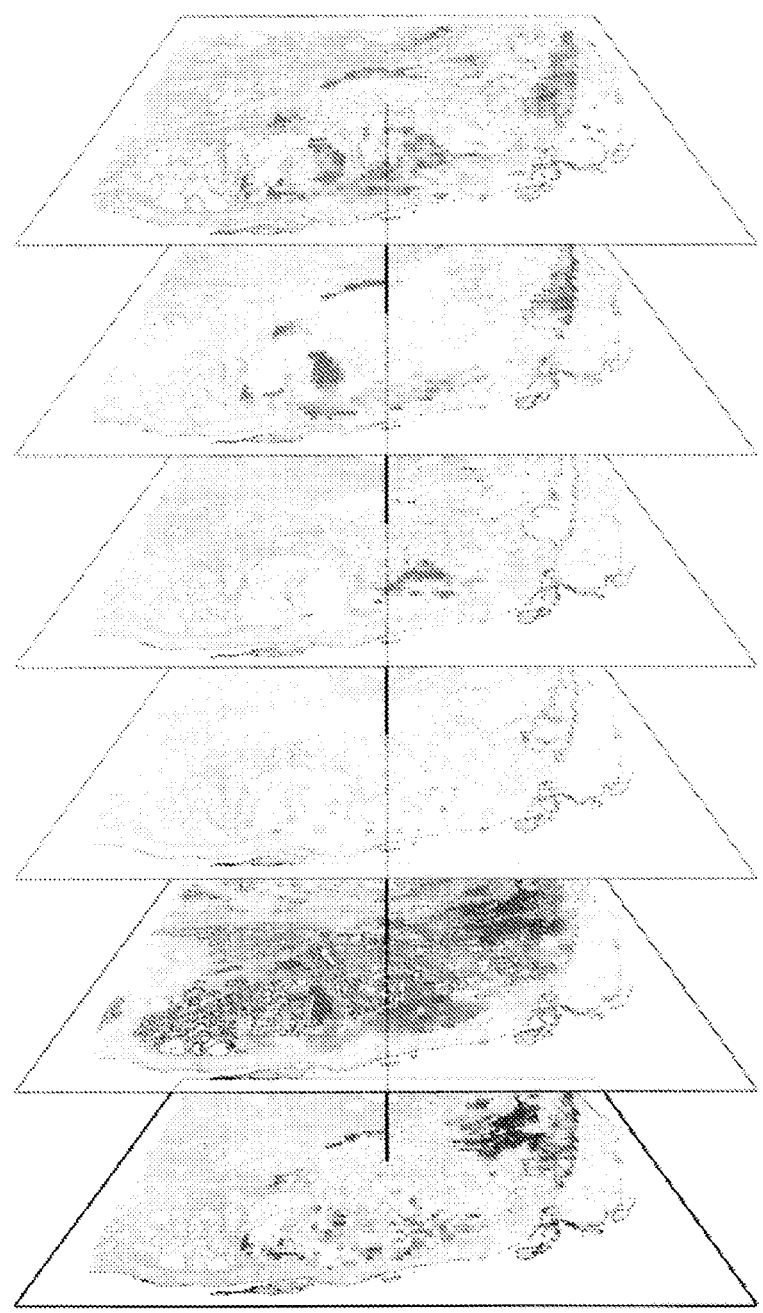
FIG. 6 illustrates a virtual alignment of several whole slide images of adjacent tissue sections.

FIG. 6 illustrates a plurality of adjacent tissue sections each receiving a virtual grid and an IHC score according to the methods described above. An IHC score of each grid square is summated across the several slides to obtain an IHC signature score.

Figure 7:
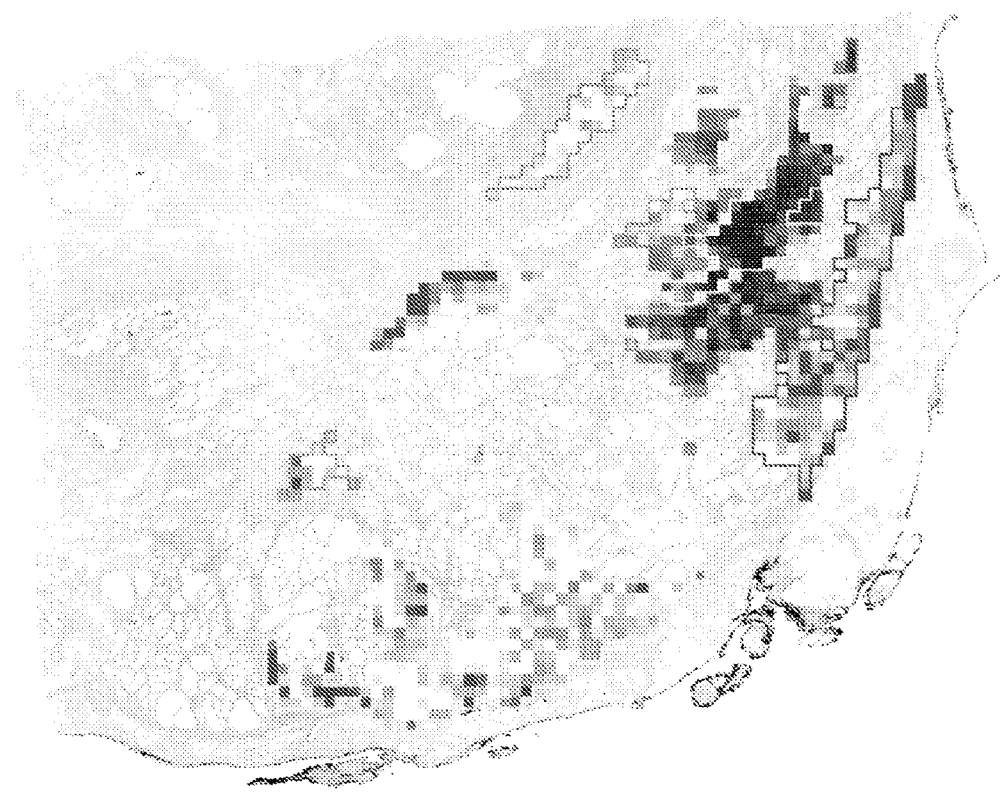
FIG. 7 illustrates an exemplary IHC signature map for a given tissue sample according to the digital images of FIG. 5.

FIG. 7 illustrates a signature map representing a two-dimensional analysis of each slide image depicted in FIG. 6.

The invention can now be further understood with the following example.

EXAMPLE 1

IHC Assays

Unstained sections of formalin-fixed, paraffin-embedded prostate tissue containing discrete areas of prostatic adenocarcinoma of different histologic grades were obtained. 3 micrometer (n+1) adjacent sections were cut from the paraffin block. One section (the reference slide) was stained with hematoxylin and eosin (H&E). Adjacent sections were stained with primary antibody directed against either prostate specific acid phosphatase using monoclonal antibody clone PASE/4LT and a heat-induced epitope retrieval method using citrate buffer, or neuron-specific enolase using monoclonal antibody clone BBS/NC/V1-h14 and a heat-induced epitope retrieval method using citrate buffer. [[CD34 clone QBend/10 without epitope retrieval; Ki67 clone MM1 with citrate buffer; Muc1 clone MaG96 with citrate buffer]] After washing, brown precipitate at sites of primary antibody binding was developed using a peroxidase-conjugated second step antibody and a 3,3-diaminobenzidine (DAB) reagent. IHC slides, and a negative control slide in which primary antibody incubation was omitted, were counterstained with hematoxylin. All slides were cover-slipped.

Whole Slide Imaging

Slides were scanned at 20× magnification (0.58 microns per raw image pixel) using a WSI instrument fitted with a 20×/0.75 Plan Apo objective lens. Images were saved in SVS format. Images were saved on a server equipped with server software (Imageserver) and retrieved using file management software (Spectrum). Pathologist-annotated tumor regions were drawn using a pen tablet screen on whole slide images viewed at high resolution using the system's annotation software (Imagescope 10).

Software Overview

A software program for generating an IHC Signature Map according to various embodiments of the invention was written in the Java programming language. The software interacts with the ImageServer application programming interface using HTTP GET/POST protocol to request image files, image size and dimensions, annotations and analysis information, to upload annotations, and to initiate a slide analysis utilizing pre-existing image processing algorithms.

The software generates IHC signature maps through a four-fold process, including the following steps: (i) communicating with ImageServer using an HTTP protocol to download images and annotations, annotations are saved to a file on the computer; (ii) whole slide images are registered to a reference image (typically an H&E stained slide image), wherein coarse image registration is accomplished with a set of user interactions followed by fine automatic registration; (iii) a virtual grid of rectangular regions with user-defined resolution is superimposed onto each slide's full resolution image, wherein analysis time is proportional to the resolution and such that, grid squares outside of annotation areas may be automatically discarded prior to generation of IHC values if pathologist annotations have been drawn on the reference slide image; and (iv) results of IHC staining for one marker within each grid square (termed an IHC score) are summated using equation 1 (above) across all IHC stains at the same grid square location (termed an IHC signature score), and all IHC signature scores are displayed as a two dimensional representation across the tissue section (termed an IHC signature map). After completing this process, all annotations are removed and original pathologist annotations are restored on ImageServer.

Resulting Process

Prior to launching the tissue analysis software, a user places whole slide images of interest into a specified folder on ImageServer and provides a list of IHC stains and corresponding weighting factors. Upon launching, the software downloads slide data including any existing WSI annotations in an XML format and generates a thumbnail image. From a list of available images (see FIG. 2), the user selects the reference image (typically an H&E-stained slide image), IHC slides to be analyzed, and an analysis algorithm macro to be used for each IHC slide. The default algorithm is Positive Pixel Count, set to detect the fraction of pixels that exceed pre-set (user-adjustable if desired) weak, moderate, and strong threshold limits in the brown colorimetric channel. If desired, other analysis algorithm macros available to the user within Spectrum appear in a drop down menu for selection.

Image Alignment

During the first step in aligning each IHC slide, the user brings the slide into rough alignment to the reference slide (FIG. 3). Initially, manual manipulations are first used to flip and rotate each IHC slide in 90 degree increments so that it is within 90 degrees of the reference. The TuboReg software is then used to automatically complete the registration process by minimizing the mean square error through ridged body transformations (i.e. translations and rotations), (FIG. 4). The tissue analysis software writes the required transformations for each IHC slide to an XML file for subsequent use in the generation of the signature maps.

Generation of an IHC Signature Map within Pathologist Annotated Regions

Using ImageScope software and a pen tablet screen, a pathologist can make detailed annotations on the reference slide image within multiple virtual planes ("layers"), each of which may be analyzed separately (FIG. 5). The tissue analysis software then generates a virtual grid across the surface of the reference slide image. Grid squares that lie outside of the image (over clear glass areas) are discarded, and grid squares that do not lie within annotation regions in which random locations (default 500) within each grid square are generated and tested for whether they lie within annotation areas can be further discarded. If a threshold (default 50%) of these locations lie within the annotated area, the grid square is retained, and if not, the grid square is discarded. These defaults may be adjusted to increase the accuracy of the estimate of the percentage of overlap (by increasing the number of random locations within each square) or discard more grid squares (by requiring a higher threshold of locations to be within each square, which serves to contract the number of retained grid squares further interior to the pathologist annotation areas). Additionally, the pathologist may review the IHC slides to be analyzed and annotate parts of each slide which lack good tissue for one of the constituent stains as a region of subtraction. The tissue analysis software determines if any of these negative regions intersects the grid squares on the reference slide and removes them. Retained grid squares from the reference image file are adjusted to mach each of the digitized IHC images based on the previously saved transformations. The aligned grid squares are written to a file in annotation XML format and attached to each IHC slide by uploading to ImageServer. At each grid location, the intensity of each IHC stain is used to generate an IHC score using the selected analysis macro, IHC Signature scores are calculated using Equation 1 and the results of all processed grid squares are displayed as IHC signature maps (FIGS. 6 and 7). After completion, the quantitative IHC data is saved in a CSV format on the computer ex, and original pathologist annotations are restored to ImageServer.

Software Output

The resulting files generated during an analysis are saved in a folder with a name of the user's choosing. Included in this folder are 5% scale images of the reference whole slide image and aligned IHC slide images, alignment overlay images, analysis grids in annotation XML, IHC Maps, the final IHC Signature Map, and the quantitative IHC data in CSV format. The resulting IHC Maps and Signature Maps are visually represented as transparent PNG images aligned to the 5% scale whole slide images with the analysis grid squares colored from blue (negative weighting) to white (neutral) to red (positive weighting) on a continuous scale. The quantitative IHC data in CSV format contains the weighted or non-weighted analysis data (depending on user settings) for each IHC stain, the final IHC Signature Map summation data, and the 2D coordinates for each grid square.

The above examples are provided for descriptive purposes only, and should not be construed as limiting the spirit and scope of the invention.

We claim:

1. A computerized method for digital analysis of tissue objects, comprising:
   providing three or more adjacent tissue sections, at least one of said adjacent tissue sections being stained with a biomarker;
   acquiring a first digital image of a first adjacent tissue section, a second digital image of a second adjacent tissue section, and a third digital image of a third adjacent tissue section;
   using a computerized software, aligning the first and third digital images with the second digital image such that the first through third digital images are two-dimensionally aligned within said computerized software;
   overlaying a first digital grid about the first digital image, the first digital grid comprising a plurality of first grid squares;
   on the first digital image, assigning a first IHC (immunohistochemistry) score to each of the plurality of first grid squares within the first digital grid, and summating the first grid squares to generate a first IHC signature score;
   overlaying a second digital grid about the second digital image, the second digital grid comprising a plurality of second grid squares;
   on the second digital image, assigning a second IHC score to each of the plurality of second grid squares within the second digital grid, and summating the second grid squares to generate a second IHC signature score;
   overlaying a third digital grid about the third digital image, the third digital grid comprising a plurality of third grid squares;
   on the third digital image, assigning a third IHC score to each of the plurality of third grid squares within the third digital grid, and summating the third grid squares to generate a third IHC signature score; and
   summating the first through third IHC signature scores to generate a numerical representation of a three-dimensional IHC score.

2. A computerized method for digital analysis of tissue objects, comprising:
   with three or more adjacent tissue sections, obtaining at least a first digital image, a second digital image, and a third digital image of said adjacent tissue sections, respectively, using a microscope adapted for digital imaging of slides;
   using a computerized software, digitally aligning said first, second, and third digital images with respect to one another;
   overlaying a virtual grid over each of said first through third digital images, said virtual grid comprising a plurality of grid squares;
   assigning an IHC (immunohistochemistry) score with respect to a pixilated area within each of the grid squares over the first digital image, and repeating for each of said second and third digital images to obtain respective IHC scores thereon;
   for each of the first through third digital images, summating each IHC score of the respective grid squares to obtain a two-dimensional IHC signature score for each slide.

3. The method of claim 2, further comprising:
   summating each of the IHC signature scores of the first through third digital images to obtain a three-dimensional IHC signature map of the tissue.

* * * * *